(12) United States Patent
Jeon et al.

(10) Patent No.: US 8,277,972 B2
(45) Date of Patent: Oct. 2, 2012

(54) NON-AQUEOUS ELECTROLYTE SOLUTION FOR LITHIUM SECONDARY BATTERY AND LITHIUM SECONDARY BATTERY COMPRISING THE SAME

(75) Inventors: Jong-Ho Jeon, Daejeon (KR); Jeong-Ju Cho, Daejeon (KR); Ho-Chun Lee, Daejeon (KR)

(73) Assignee: LG Chem, Ltd., Seoul (KR)

( * ) Notice: Subject to any disclaimer, the term of this patent is extended or adjusted under 35 U.S.C. 154(b) by 77 days.

(21) Appl. No.: 12/933,336

(22) PCT Filed: Mar. 9, 2009

(86) PCT No.: PCT/KR2009/001167
§ 371 (c)(1),
(2), (4) Date: Sep. 17, 2010

(87) PCT Pub. No.: WO2009/116740
PCT Pub. Date: Sep. 24, 2009

(65) Prior Publication Data
US 2011/0008684 A1   Jan. 13, 2011

(30) Foreign Application Priority Data
Mar. 18, 2008 (KR) .................. 10-2008-0024998

(51) Int. Cl.
*H01M 6/04* (2006.01)
(52) U.S. Cl. ........ 429/199; 429/307; 429/200; 429/340; 429/342; 429/338; 429/330; 429/332; 252/62.2

(58) Field of Classification Search .................. 429/199, 429/200, 340, 330, 332, 307, 338, 342; 252/62.2
See application file for complete search history.

(56) References Cited

U.S. PATENT DOCUMENTS

| | | |
|---|---|---|
| 2004/0137333 A1 | 7/2004 | Nishiyama et al. |
| 2005/0175867 A1* | 8/2005 | Adachi et al. .................. 429/12 |
| 2009/0325065 A1 | 12/2009 | Fujii et al. |

FOREIGN PATENT DOCUMENTS

| | | |
|---|---|---|
| JP | 2002-343424 A | 11/2002 |
| JP | 2004-235145 A | 8/2004 |
| JP | 2005-149750 A | 6/2005 |
| JP | 2005-228631 A | 8/2005 |
| JP | 2005-251677 A | 9/2005 |
| JP | 2006-339020 A | 12/2006 |
| JP | 2006-351337 A | 12/2006 |
| JP | 2007-317654 A | 12/2007 |

* cited by examiner

*Primary Examiner* — Laura Weiner
(74) *Attorney, Agent, or Firm* — Birch, Stewart, Kolasch & Birch, LLP

(57) ABSTRACT

A non-aqueous electrolyte solution for a lithium secondary battery includes a lithium salt and a carbonate organic solvent. The non-aqueous electrolyte solution further includes a fluoro group-containing sulphonate compound expressed by Chemical Formula 1. When the non-aqueous electrolyte solution is employed for a lithium secondary battery, low-temperature discharging characteristics and life cycle characteristics are greatly improved. Also, even though a battery is stored at a high temperature in a fully-charged state or a charging/discharging process is under progress, the decomposition reaction of a carbonate-based organic solvent is restrained, thereby solving the swelling problem and improving high-temperature life cycle characteristics.

15 Claims, No Drawings

NON-AQUEOUS ELECTROLYTE SOLUTION FOR LITHIUM SECONDARY BATTERY AND LITHIUM SECONDARY BATTERY COMPRISING THE SAME

TECHNICAL FIELD

The present invention relates to a non-aqueous electrolyte solution for a lithium secondary battery, and a lithium secondary battery comprising the same.

BACKGROUND ART

Recently, interest in energy storage technologies has increased. As the energy storage techniques are extended to such devices as cellular phones, camcorders and notebook PCs, and further to electric vehicles, the demand for a high energy density battery used as a power source of such an electronic device is increased. A lithium ion secondary battery is one of the most satisfactory batteries, and numerous studies towards improvements are now in progress actively.

Among the currently used secondary batteries, a lithium secondary battery developed in the early 1990 s includes an anode made of carbon material capable of occluding or emitting lithium ions, a cathode made of lithium-containing oxide, and a non-aqueous electrolyte solution obtained by dissolving a suitable amount of lithium salt in a mixed organic solvent.

The lithium secondary battery has an average discharge voltage of about 3.6V to about 3.7V, which exhibits an advantageously higher operation voltage than those of other batteries such as alkali batteries or nickel-cadmium batteries. To create such a higher operation voltage, an electrolyte composition should be electrochemically stable in a charging/discharging voltage range from 0 to 4.2V. For this purpose, a mixed solvent in which a cyclic carbonate compound such as ethylene carbonate or propylene carbonate and a linear carbonate compound such as dimethyl carbonate, ethylmethyl carbonate or diethyl carbonate are suitably mixed is used as a solvent for the electrolyte. The solute of the electrolyte is usually a lithium salt such as $LiPF_6$, $LiBF_4$ or $LiClO_4$, which acts as a source for supplying lithium ions in the battery and thus enables the lithium battery to operate.

Lithium ions coming out from the cathode active material such as lithium metal oxide during an initial charging process of a lithium secondary battery move towards the anode active material, such as graphite, and then are intercalated between layers of the anode active material. At this time, due to the high reactivity of lithium, the electrolyte reacts with carbon of the anode active material on the surface of the anode active material such as graphite, thereby generating compounds such as $Li_2CO_3$, $Li_2O$ and $LiOH$. These compounds form a kind of SEI (Solid Electrolyte Interface) film on the surface of the anode active material such as graphite.

The SEI film plays the role of an ion tunnel, which allows only lithium ions to pass. Due to the ion tunnel effects, the SEI film prevents organic solvent having high molecular weight from moving together with lithium ions in the electrolyte solution and having a great molecular weight from being intercalated into layers of the anode active material and thus breaking down the anode structure. Thus, since the electrolyte solution is not contacted with the anode active material, the electrolyte solution is not decomposed, and also the amount of lithium ions in the electrolyte solution is reversibly maintained, thereby ensuring stable charging/discharging.

However, in a thin angled battery, while the above SEI film is formed, gas such as $CO$, $CO_2$, $CH_4$ and $C_2H_6$, generated by decomposition of a carbonate solvent, increases a battery thickness during a charging process. In addition, if a battery is left at a high temperature in a fully charged state, the SEI film is slowly broken down due to increased electrochemical energy and thermal energy over time. As a result, side reactions continuously occur between the exposed surface of the anode and surrounding electrolyte. Due to continuous gas generation at this time, an inner pressure of the battery is increased, thereby increasing thickness of the battery, and this may cause problems in electronics such as cellular phones and notebook computers with regard to a high-temperature performance of the battery.

In order to solve the above problems, studies have been conducted to change the phase of the SEI film forming reaction by adding an additive to a carbonate organic solvent. For example, Japanese Laid-open Patent Publication Nos. 2006-351337 and 2006-339020 disclose a non-aqueous electrolyte solution to which a fluoro group-containing sulphonate compound expressed by a predetermined chemical formula is added.

However, when the specific compound is added to an electrolyte solution to improve battery performances, some areas of performance are improved, but other areas of performance may deteriorate in many cases. Thus, there is a continuous demand to develop a non-aqueous electrolyte solution containing an additive, which may minimize such side effects.

DISCLOSURE OF INVENTION

Technical Problem

The present invention is designed to solve the problems of the prior art. Therefore, it is an object of the present invention to provide a non-aqueous electrolyte solution for a lithium secondary battery, which ensures excellent discharging characteristics at a low temperature and an extended life cycle over charging/discharging cycles, which solves the swelling problem of a battery by restraining the decomposition reaction of a carbonate organic solvent even though the battery is stored at a high temperature in a fully-charged state or is undergoing a charging/discharging process, and which improves high-temperature life cycle characteristics, when the non-aqueous electrolyte is used in a lithium secondary battery. The present invention is also directed to a lithium secondary battery having the non-aqueous electrolyte solution.

Technical Solution

In order to accomplish the above object, the present invention provides a non-aqueous electrolyte solution for a lithium secondary battery, which includes a lithium salt and a carbonate organic solvent, wherein the non-aqueous electrolyte solution further includes a fluoro group-containing sulphonate compound expressed by the following Chemical Formula 1.

Chemical Formula 1

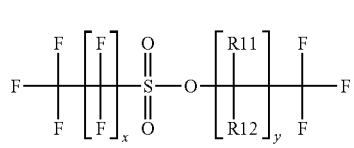

where x is an integer of 1 to 4, y is an integer of 1 to 2, and R11 and R12 are independently a hydrogen atom or an alkyl group having a carbon number of 1 to 2, respectively.

In the non-aqueous electrolyte solution for a lithium secondary battery according to the present invention, the fluoro group-containing sulphonate compound is preferably any one compound or a mixture of at least two compounds selected from the group consisting of 2,2,2-trifluoroethyl 1,1,2,2,3,3,4,4,4-nonafluorobutane-1-sulfonate, 2,2,2-trifluoroethyl 1,1,2,2,3,3,3-heptafluoropropane-1-sulfonate, 2,2,2-trifluoroethyl 1,1,2,2,2-pentafluoroethanesulfonate, and 1,1,1-trifluoropropan-2-yl 1,1,2,2,3,3,4,4,4-nonafluorobutane-1-sulfonate.

In the non-aqueous electrolyte solution for a lithium secondary battery according to the present invention, the carbonate organic solvent may be any one material selected from the group consisting of a cyclic carbonate compound, a linear carbonate compound, and their mixtures. The cyclic carbonate compound may be any one material selected from the group consisting of a compound expressed by the following Chemical Formula 2, a compound expressed by the following Chemical Formula 3, and their mixtures. Also, the linear carbonate compound may be a compound expressed by the following Chemical Formula 4.

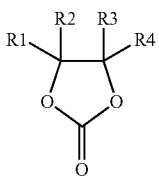

Chemical Formula 2 where R1 to R4 are independently any one selected from the group consisting of a hydrogen atom, fluorine, and an alkyl group having a carbon number of 1 to 4, respectively.

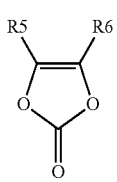

Chemical Formula 3 where R5 and R6 are independently a hydrogen atom or an alkyl group having a carbon number of 1 to 4, respectively.

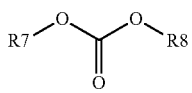

Chemical Formula 4 where R7 and R8 are independently an alkyl group having a carbon number of 1 to 4, in which at least one hydrogen atom is unsubstituted or substituted with fluorine, respectively.

In addition, the non-aqueous electrolyte solution according to the present invention preferably further includes a linear ester compound expressed by the following Chemical Formula 5. The linear ester compound is preferably any one compound or a mixture of at least two compounds selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

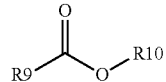

Chemical Formula 5 where R9 and R10 are independently an alkyl group having a carbon number of 1 to 4, in which at least one hydrogen atom is unsubstituted or substituted with fluorine, respectively. R9 preferably has a carbon number of 2.

The above-mentioned non-aqueous electrolyte solution may be usefully applied to a common lithium secondary battery having an anode and a cathode.

MODE FOR THE INVENTION

Hereinafter, preferred embodiments of the present invention will be described in detail. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation.

A non-aqueous electrolyte solution for a lithium secondary battery includes a lithium salt and a carbonate organic solvent, and the non-aqueous electrolyte solution further includes a fluoro group-containing sulphonate compound expressed by the following Chemical Formula 1.

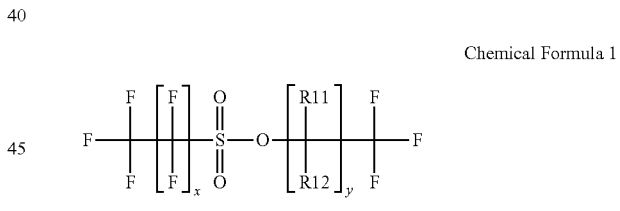

Chemical Formula 1 where x is an integer of 1 to 4, y is an integer of 1 to 2, and R11 and R12 are independently a hydrogen atom or an alkyl group having a carbon number of 1 to 2, respectively.

The present non-aqueous electrolyte solution containing the fluoro group-containing sulphonate compound expressed by the Chemical Formula 1 solves the aforementioned problems caused by the use of a carbonate organic solvent, so it restrains the decomposition reaction of the carbonate organic solvent even though a battery is stored at a high temperature in a fully-charged state or is undergoing a charging/discharging process. Accordingly, the swelling phenomenon of a battery is minimized, and high-temperature life cycle characteristics of the battery are improved.

Non-limiting examples of the fluoro group-containing sulphonate compound of the Chemical Formula 1 may include any one compound or a mixture of at least two compounds selected from the group consisting of 2,2,2-trifluoroethyl 1,1,2,2,3,3,4,4,4-nonafluorobutane-1-sulfonate, 2,2,2-trifluoroethyl 1,1,2,2,3,3,3-heptafluoropropane-1-sulfonate, 2,2,2- trifluoroethyl 1,1,2,2,2-pentafluoroethanesulfonate, and 1,1,1-trifluoropropan-2-yl 1,1,2,2,3,3,4,4,4-nonafluorobutane-1-sulfonate.

In the non-aqueous electrolyte solution of the present invention, the content of the fluoro group-containing sulphonate compound expressed by the Chemical Formula 1 is preferably about 0.1 to about 10 parts by weight, based on 100 parts by weight of the non-aqueous electrolyte solution.

In the non-aqueous electrolyte solution for a lithium secondary battery according to the present invention, the lithium salt included as an electrolyte may use any material commonly used as an electrolyte for a lithium secondary battery. Non-limiting examples of the lithium salt may include $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$. In addition, other compounds such as lactone, ether, ester, acetonitrile, lactam, and ketone may be added to the non-aqueous electrolyte of the lithium secondary battery without departing from the purpose of the present invention.

In addition, the carbonate organic solvent included in the non-aqueous electrolyte solution of the present invention may employ any compound commonly used in an electrolyte for a lithium secondary battery, for example, a cyclic carbonate compound, a linear carbonate compound, or their mixtures.

The cyclic carbonate compound may employ any one compound selected from the group consisting of a compound expressed by the following Chemical Formula 2, a compound expressed by the following Chemical Formula 3, and their mixtures.

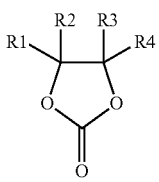

Chemical Formula 2 where R1 to R4 are independently any one selected from the group consisting of a hydrogen atom, fluorine, and an alkyl group having a carbon number of 1 to 4, respectively.

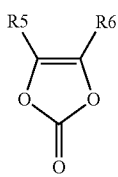

Chemical Formula 3 where R5 and R6 are independently a hydrogen atom or an alkyl group having a carbon number of 1 to 4, respectively.

The cyclic carbonate compound expressed by the Chemical Formula 2 or 3 easily dissociates lithium salts in an electrolyte and thus attributes to the improvement of charge/discharge capacities of a battery. The carbonate compound expressed by the Chemical Formula 2 may include ethylene carbonate, propylene carbonate, fluoroethylene carbonate and butylene carbonate alone or in combination. In particular, ethylene carbonate or a mixture of ethylene carbonate and propylene carbonate may more easily dissociate a lithium salt in an electrolyte due to high dielectric constants. In case a mixture of ethylene carbonate and propylene carbonate is used, a volume ratio of propylene carbonate is preferably 0.25 to 1 with respect to ethylene carbonate. The carbonate compound expressed by the Chemical Formula 3 may include vinylene carbonate.

The linear carbonate compound may employ a compound expressed by the following Chemical Formula 4.

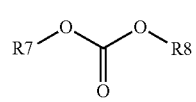

Chemical Formula 4 where R7 and R8 are independently an alkyl group having a carbon number of 1 to 4, in which at least one hydrogen atom is unsubstituted or substituted with fluorine, respectively.

In addition, the non-aqueous electrolyte solution of the present invention may further include a linear ester compound expressed by the following Chemical Formula 5.

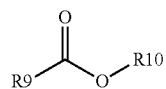

Chemical Formula 5 where R9 and R10 are independently an alkyl group having a carbon number of 1 to 4, in which at least one hydrogen atom is unsubstituted or substituted with fluorine, respectively. R9 preferably has a carbon number of 2.

The linear ester compound expressed by the Chemical Formula 5 is an organic solvent with a low viscosity and low melting point, which exhibits a low freezing point and a relatively high boiling point and exhibits excellent low-temperature characteristics. In addition, the linear ester compound such as propionate-based ester has a relatively low reactivity against an anode made of carbon material. Such a linear ester compound is mixed with the aforementioned cyclic carbonate to attribute to the improvement of low-temperature discharging characteristics and life cycle. That is to say, the linear ester compound improves low-temperature discharging characteristics and high-rate discharging characteristics of a battery since it exhibits high ionic conductivity at normal and low temperatures by suitably coordinating lithium ions. In addition, since an oxidation voltage of the linear ester compound, which is an inherent feature of solvent, is about 4.5V or above, it provides resistance against the decomposition reaction of electrolyte at a cathode during a charging process, thereby extending life cycle of a battery. Also, since the wettability of an electrode is improved rather than in the case where an ester carbonate solvent is used alone as a non-aqueous electrolyte solution, it restrains formation of lithium dendrite on an electrode surface, thereby improving the safety properties of a battery.

The linear ester compound preferably employs any one compound or a mixture of at least two compounds selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

In the above non-aqueous electrolyte solution, considering low-temperature discharging characteristics, high-rate charging/discharging characteristics and life cycle characteristics of a lithium secondary battery, a volume ratio (a:b) of (a) a cyclic carbonate compound and (b) a mixed solvent of linear carbonate compound and linear ester compound, is preferably controlled to be in the range from about 10:90 to about 70:30, more preferably from 20:80 to 60:40.

The non-aqueous electrolyte solution of the lithium secondary battery according to the present invention can be applied to a lithium secondary battery having an anode made of carbon material, metal alloy, lithium-containing oxide and silicon-containing material bondable to lithium, which are capable of occluding or emitting lithium ions, and a cathode made of lithium-containing oxide or the like.

The carbon material capable of occluding or emitting a lithium ion may employ any material capable of being used as a carbon material anode of a lithium secondary battery such as low-crystalline carbon and high-crystalline carbon. Non-limiting examples of the low-crystalline carbon include soft carbon or hard carbon, and non-limiting examples of the high-crystalline carbon include natural graphite, Kish graphite, pyrolytic carbon, mesophase pitch based carbon fiber, mesocarbon microbeads, mesophase pitches, and high-temperature sintered carbon such as petroleum or coal tar pitch derived cokes. At this time, the anode may have a binding agent, which may employ various kinds of binder polymer such as PVDF-co-HFP (polyvinylidenefluoride-co-hexafluoropropylene), polyvinylidenefluoride, polyacrylonitrile, polymethylmethacrylate, SBR (Styrene Butadiene Rubber), modified SBR and the like.

In addition, a cathode active material made of lithium-containing oxide preferably employs a lithium-containing transition metal oxide, for example any one material or a mixture of at least two materials selected from the group consisting of $LiCoO_2$, $LiNiO_2$, $LiMnO_2$, $LiMn_2O_4$, $Li(Ni_aCo_bMn_c)O_2$ ($0<a<1$, $0<b<1$, $0<c<1$, $a+b+c=1$), $LiNi_{1-y}Co_yO_2$, $LiCo_{1-y}Mn_yO_2$, $LiNi_{1-y}Mn_yO_2$ ($0<y<1$), $Li(Ni_aCo_bMn_c)O_4$ ($0<a<2$, $0<b<2$, $0<c<2$, $a+b+c=2$), $LiMn_{2-z}Ni_zO_4$, $LiMn_{2-z}Co_zO_4$ ($0<z<2$), $LiCoPO_4$ and $LiFePO_4$, but it is not limited thereto.

In addition, a separator is commonly interposed between the cathode and the anode, and may be common porous polymer films used as a conventional separator, such as porous polymer film made using ethylene homopolymer, propylene homopolymer, ethylene/butene copolymer, ethylene/hexene copolymer or ethylene/methacrylate copolymer, in a single layer or in laminate form. In other cases, the separator may be a common porous non-woven fabric such as a non-woven fabric made of glass fiber with a high melting point or polyethylene terephthalate fiber, but it is not limited thereto.

There is no particular limitation regarding the type of shape of the lithium secondary battery which may be in a cylindrical can shape, an angled shape, a pouch shape or a coin shape.

Hereinafter, the present invention is explained in more detail using Embodiments. However, the following Embodiments may be modified in various ways, and the present invention should not be interpreted as being limited thereto. The following Embodiments are just given for persons having ordinary skill in the art to understand the present invention in a better way.

Embodiment 1

1M $LiPF_6$ was added to a mixed organic solvent in which ethylene carbonate (EC), ethyl propionate (EP), propylene carbonate (PC) and ethylmethyl carbonate (EMC) are mixed in a volume ratio of 3:5:1:1 to make a non-aqueous electrolyte, and then 0.2 parts by weight of 2,2,2-trifluoroethyl 1,1,2,2,3,3,4,4,4-nonafluorobutane-1-sulfonate, based on the non-aqueous electrolyte solution was added thereto to prepare a non-aqueous electrolyte solution.

A battery was manufactured using the non-aqueous electrolyte solution for a lithium secondary battery, prepared as mentioned above. The non-aqueous electrolyte was injected into a pouch-type battery using $LiCoO_2$ as a cathode active material and artificial graphite as an anode active material, thereby manufacturing a lithium secondary battery.

Embodiment 2

A pouch-type battery was manufactured in the same way as in the Embodiment 1, except that 0.5 parts by weight of 2,2,2-trifluoroethyl 1,1,2,2,3,3,4,4,4-nonafluorobutane-1-sulfonate was added.

Embodiment 3

A pouch-type battery was manufactured in the same way as in the Embodiment 1, except that 1 parts by weight of 2,2,2-trifluoroethyl 1,1,2,2,3,3,4,4,4-nonafluorobutane-1-sulfonate was added.

Embodiment 4

A pouch-type battery was manufactured in the same way as in the Embodiment 1, except that 5 parts by weight of 2,2,2-trifluoroethyl 1,1,2,2,3,3,4,4,4-nonafluorobutane-1-sulfonate was added.

Embodiment 5

A pouch-type lithium secondary battery was manufactured in the same way as in the Embodiment 3, except that a mixed organic solvent in which ethylene carbonate (EC) and ethylmethyl carbonate (EMC) was mixed in a volume ratio of 4:6 was used.

Embodiment 6

A pouch-type lithium secondary battery was manufactured in the same way as in the Embodiment 3, except that a mixed organic solvent in which ethylene carbonate (EC) and dimethyl carbonate (DMC) was mixed in a volume ratio of 4:6 was used.

Embodiment 7

A pouch-type lithium secondary battery was manufactured in the same way as in the Embodiment 3, except that a mixed organic solvent in which ethylene carbonate (EC) and diethyl carbonate (DEC) was mixed in a volume ratio of 4:6 was used.

Embodiment 8

A pouch-type lithium secondary battery was manufactured in the same way as in the Embodiment 3, except that a mixed organic solvent in which ethylene carbonate (EC) and ethyl propionate (EP) was mixed in a volume ratio of 4:6 was used.

Embodiment 9

A pouch-type lithium secondary battery was manufactured in the same way as in the Embodiment 3, except that 2 parts by weight of vinylene carbonate (VC) and 3 parts by weight of propane sultone (PS) was respectively added, based on the non-aqueous electrolyte solution.

Embodiment 10

A pouch-type lithium secondary battery was manufactured in the same way as in the Embodiment 5, except that 2 parts by weight of vinylene carbonate (VC) and 3 parts by weight of propane sultone (PS) was respectively added, based on the non-aqueous electrolyte solution.

Embodiment 11

A pouch-type lithium secondary battery was manufactured in the same way as in the Embodiment 6, except that 2 parts by weight of vinylene carbonate (VC) and 3 parts by weight of propane sultone (PS) was respectively added, based on the non-aqueous electrolyte solution.

Embodiment 12

A pouch-type lithium secondary battery was manufactured in the same way as in the Embodiment 7, except that 2 parts by weight of vinylene carbonate (VC) and 3 parts by weight of propane sultone (PS) was respectively added, based on the non-aqueous electrolyte solution.

Embodiment 13

A pouch-type lithium secondary battery was manufactured in the same way as in the Embodiment 8, except that 2 parts by weight of vinylene carbonate (VC) and 3 parts by weight of propane sultone (PS) was respectively added, based on the non-aqueous electrolyte solution.

COMPARATIVE EXAMPLE 1

A pouch-type lithium secondary battery was manufactured in the same way as in the Embodiment 4, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 2

A pouch-type lithium secondary battery was manufactured in the same way as in the Embodiment 5, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 3

A pouch-type lithium secondary battery was manufactured in the same way as in the Embodiment 6, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 4

A pouch-type lithium secondary battery was manufactured in the same way as in the Embodiment 7, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 5

A pouch-type lithium secondary battery was manufactured in the same way as in the Embodiment 8, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 6

A pouch-type lithium secondary battery was manufactured in the same way as in the Embodiment 9, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 7

A pouch-type lithium secondary battery was manufactured in the same way as in the Embodiment 10, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 8

A pouch-type lithium secondary battery was manufactured in the same way as in the Embodiment 11, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 9

A pouch-type lithium secondary battery was manufactured in the same way as in the Embodiment 12, except that a non-aqueous electrolyte in which 2,2,2-trifluoroethyl 1,1,2,2,3,3,4,4,4-nonafluorobutane-1-sulfonate was not added was used.

COMPARATIVE EXAMPLE 10

A pouch-type lithium secondary battery was manufactured in the same way as in the Embodiment 13, except that a non-aqueous electrolyte in which 2,2,2-trifluoroethyl 1,1,2,2,3,3,4,4,4-nonafluorobutane-1-sulfonate was not added was used.

Evaluation Method of Initial Efficiency and Life Cycle Performance of Batteries

After electrolyte was injected into the pouch-type batteries manufactured according to the embodiments and the Comparative Examples, the batteries were aged at a normal temperature for 2 days and then charged for 50 minutes at a 0.2 C-rate. Subsequently, the batteries were degassed and resealed, charged to 4.2V at a 0.2 C at room temperature under a constant current/constant voltage condition, and then discharged to 3.0V at a 0.2 C under a constant current condition, which is called an initial charging/discharging process. At this time, a ratio of charge capacity to the discharge capacity is called an initial efficiency. After the initial charging/discharging, the batteries were charged/discharged 400 times at a 1.0 C-rate in the same voltage region. A sustainable yield of capacity (life cycle performance) at 400 times relative to the initial discharge capacity is listed in the following Table 1.

Evaluation Method of High-Rate Discharging Performance of Batteries

After the pouch-type batteries manufactured according to the Embodiments and the Comparative Examples were initially charged/discharged, the batteries were charged/discharged 4 times at a 1.0 C-rate, charged at a 1.0 C-rate, and then discharged at 0.2 C-rate in the same voltage region. At this time, a high-rate discharging ratio between a fourth discharge capacity at a 1.0 C-rate and a discharge capacity at a 0.2 C rate is listed in the following Table 1.

Evaluation Method of Low-Temperature Discharging Performance of Batteries

After the pouch-type batteries manufactured according to the Embodiments and the Comparative Examples were initially charged/discharged, the batteries were charged at a 1.0 C-rate and discharged at a 0.2 C-rate at a normal temperature in the same voltage region. Subsequently, The batteries charged at a 1.0 C-rate were put into a low-temperature chamber of −20° C., and then discharged at a 0.2 C-rate. At this time, a low-temperature discharging ratio between discharge capacities at normal temperature and −20° C. is shown in the following Table 1.

Evaluation Method of Thickness Change During High Temperature Storage

After the pouch-type batteries manufactured according to the Embodiments and the Comparative Examples were initially charged/discharged, the batteries were respectively charged/discharged 4 times at a 0.1 C-rate, charged to 4.2V at a 1.0 C-rate, then heated to 90° C. for 1 hour, and then preserved at 90° C. for 4 hours. Then, the change of battery thickness between the normal temperature and the high temperature was measured and listed in the following Table 1.

TABLE 1

| | Initial efficiency (%) | High-rate discharging performance (%) | Life cycle performance (%) | Change of thickness (%) | Low-temperature discharging performance (%) |
|---|---|---|---|---|---|
| Embodiment 1 | 90.1 | 92.5 | 83.1 | 24.6 | 70.8 |
| Embodiment 2 | 90.1 | 92.3 | 84.0 | 20.3 | 73.2 |
| Embodiment 3 | 90.5 | 92.0 | 85.2 | 18.4 | 74.0 |
| Embodiment 4 | 90.0 | 91.2 | 85.6 | 10.8 | 72.9 |
| Embodiment 5 | 89.9 | 90.7 | 82.4 | 25.9 | 65.9 |
| Embodiment 6 | 90.0 | 91.6 | 80.9 | 35.7 | 59.8 |
| Embodiment 7 | 90.1 | 87.8 | 82.2 | 20.5 | 55.3 |
| Embodiment 8 | 90.8 | 93.1 | 84.8 | 21.9 | 79.2 |
| Embodiment 9 | 90.8 | 91.4 | 85.5 | 17.7 | 72.5 |
| Embodiment 10 | 90.2 | 90.2 | 83.6 | 24.4 | 63.8 |
| Embodiment 11 | 90.2 | 91.2 | 81.2 | 30.9 | 55.7 |
| Embodiment 12 | 90.1 | 87.6 | 84.0 | 19.7 | 51.5 |
| Embodiment 13 | 90.9 | 92.5 | 84.9 | 20.4 | 80.0 |
| Comparative example 1 | 84.2 | 91.0 | 24.8 | 48.6 | 67.9 |
| Comparative example 2 | 87.8 | 88.3 | 35.6 | 52.2 | 48.7 |
| Comparative example 3 | 88.0 | 89.4 | 20.4 | 61.6 | 40.4 |
| Comparative example 4 | 87.9 | 85.4 | 33.3 | 40.8 | 33.8 |
| Comparative example 5 | 89.2 | 91.6 | 35.5 | 43.8 | 81.0 |
| Comparative example 6 | 90.0 | 91.1 | 78.9 | 43.6 | 66.6 |
| Comparative example 7 | 89.9 | 89.0 | 65.4 | 56.4 | 50.2 |
| Comparative example 8 | 89.7 | 89.5 | 67.2 | 60.5 | 44.1 |
| Comparative example 9 | 89.7 | 86.0 | 70.0 | 36.9 | 38.5 |
| Comparative example 10 | 90.0 | 92.3 | 73.8 | 43.0 | 79.8 |

INDUSTRIAL APPLICABILITY

When the non-aqueous electrolyte solution of the present invention is used for a lithium secondary battery, low-temperature discharging characteristics and life cycle characteristics are excellent. In addition, though a battery is stored at a high temperature in a fully-charged state or a charging/discharging process is under progress, the decomposition reaction of a carbonate-based organic solvent is restrained, thereby solving the swelling problem. Accordingly, high-temperature life cycle characteristics of the battery may also be improved.

The invention claimed is:

1. A non-aqueous electrolyte solution for a lithium secondary battery, comprising:
   a lithium salt;
   a carbonate organic solvent; and
   a fluoro group-containing sulphonate compound expressed by the following Chemical Formula 1:

Chemical Formula 1

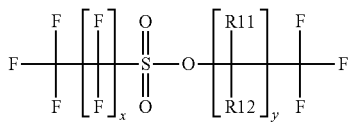

where x is an integer of 1 to 4, y is an integer of 1 to 2, and R11 and R12 are independently a hydrogen atom or an alkyl group having a carbon number of 1 to 2, respectively.

2. The non-aqueous electrolyte solution for a lithium secondary battery according to claim 1, wherein the content of the fluoro group-containing sulphonate compound is about 0.1 to about 10 parts by weight, based on 100 parts by weight of the non-aqueous electrolyte solution.

3. The non-aqueous electrolyte solution for a lithium secondary battery according to claim 1, wherein the fluoro group-containing sulphonate compound is any one compound or a mixture of at least two compounds selected from the group consisting of 2,2,2-trifluoroethyl 1,1,2,2,3,3,4,4,4-nonafluorobutane-1-sulfonate, 2,2,2-trifluoroethyl 1,1,2,2,3,3,3-heptafluoropropane-1-sulfonate, 2,2,2-trifluoroethyl 1,1,2,2,2-pentafluoroethanesulfonate, and 1,1,1-trifluoropropan-2-yl 1,1,2,2,3,3,4,4,4-nonafluorobutane-1-sulfonate.

4. The non-aqueous electrolyte solution for a lithium secondary battery according to claim 1, wherein the carbonate organic solvent is any one compound selected from the group consisting of a cyclic carbonate compound, a linear carbonate compound, and their mixtures.

5. The non-aqueous electrolyte solution for a lithium secondary battery according to claim 4, wherein the cyclic carbonate compound is any one compound selected from the group consisting of a compound expressed by the following Chemical Formula 2, a compound expressed by the following Chemical Formula 3, and mixtures thereof:

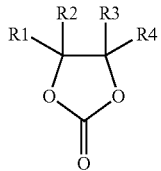

Chemical Formula 2 where R1 to R4 are independently any one selected from the group consisting of a hydrogen atom, fluorine, and an alkyl group having a carbon number of 1 to 4, respectively,

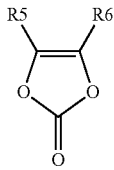

Chemical Formula 3 where R5 and R6 are independently a hydrogen atom or an alkyl group having a carbon number of 1 to 4, respectively.

6. The non-aqueous electrolyte solution for a lithium secondary battery according to claim 4, wherein the linear carbonate compound is a compound expressed by the following Chemical Formula 4:

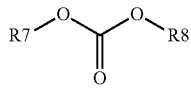

Chemical Formula 4 where R7 and R8 are independently an alkyl group having a carbon number of 1 to 4, in which at least one hydrogen atom is unsubstituted or substituted with fluorine, respectively.

7. The non-aqueous electrolyte solution for a lithium secondary battery according to claim 1, wherein the non-aqueous electrolyte solution further includes a linear ester compound expressed by the following Chemical Formula 5:

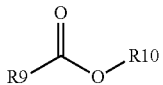

Chemical Formula 5 where R9 and R10 are independently an alkyl group having a carbon number of 1 to 4, in which at least one hydrogen atom is unsubstituted or substituted with fluorine, respectively.

8. The non-aqueous electrolyte solution for a lithium secondary battery according to claim 7, wherein the linear ester compound is any one compound or a mixture of at least two compounds selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

9. The non-aqueous electrolyte solution for a lithium secondary battery according to claim 1, wherein the lithium salt is any one material or a mixture of at least two materials selected from the group consisting of $LiPF_6$, $LiBF_4$, $LiSbF_6$, $LiAsF_6$, $LiClO_4$, $LiN(C_2F_5SO_2)_2$, $LiN(CF_3SO_2)_2$, $CF_3SO_3Li$, $LiC(CF_3SO_2)_3$ and $LiC_4BO_8$.

10. A lithium secondary battery comprising an anode, a cathode and a non-aqueous electrolyte solution, wherein the non-aqueous electrolyte solution is a non-aqueous electrolyte solution for the lithium secondary battery, defined in claim 1.

11. A non-aqueous electrolyte solution for a lithium secondary battery, comprising:
a lithium salt;
a carbonate organic solvent;
a fluoro group-containing sulphonate compound expressed by the following Chemical Formula 1; and
a propionate-based ester expressed by the following Chemical Formula 5:

Chemical Formula 1 where x is an integer of 1 to 4, y is an integer of 1 to 2, and R11 and R12 are independently a hydrogen atom or an alkyl group having a carbon number of 1 to 2, respectively, and

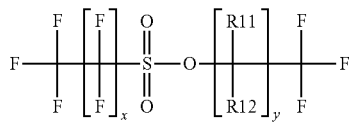

Chemical Formula 5 where R9 is an alkyl group having a carbon number of 2 and R10 is an alkyl group having a carbon number of 1 to 4, in which at least one hydrogen atom of R9 and R10 is unsubstituted or substituted with fluorine, respectively.

12. The non-aqueous electrolyte solution for a lithium secondary battery according to claim 11, wherein the content of the fluoro group-containing sulphonate compound is about 0.1 to about 10 parts by weight, based on 100 parts by weight of the non-aqueous electrolyte solution.

13. The non-aqueous electrolyte solution for a lithium secondary battery according to claim 11, wherein the fluoro group-containing sulphonate compound is any one compound or a mixture of at least two compounds selected from the group consisting of 2,2,2-trifluoroethyl 1,1,2,2,3,3,4,4,4-nonafluorobutane-1-sulfonate, 2,2,2-trifluoroethyl 1,1,2,2,3,3,3-heptafluoropropane-1-sulfonate, 2,2,2-trifluoroethyl 1,1,2,2,2-pentafluoroethanesulfonate, and 1,1,1-trifluoropropan-2-yl 1,1,2,2,3,3,4,4,4-nonafluorobutane-1-sulfonate.

14. The non-aqueous electrolyte solution for a lithium secondary battery according to claim 11, wherein the propionate-based ester compound is any one compound or a mixture of at least two compounds selected from the group consisting of ethyl propionate, ethyl 3-fluoropropanoate, ethyl 3,3-difluoropropanoate, ethyl 3,3,3-trifluoropropanoate, 2-fluoroethyl propionate, 2,2-difluoroethyl propionate, 2,2,2-trifluoroethyl propionate, 2,2,2-trifluoroethyl 3-fluoropropanoate, 2,2,2-trifluoroethyl 3,3-difluoropropanoate, and 2,2,2-trifluoroethyl 3,3,3-trifluoropropanoate.

15. A lithium secondary battery comprising an anode, a cathode and a non-aqueous electrolyte solution, wherein the non-aqueous electrolyte solution is a non-aqueous electrolyte solution for the lithium secondary battery, defined in claim 11.

* * * * *